(12) United States Patent
Chuang et al.

(10) Patent No.: US 12,309,419 B2
(45) Date of Patent: May 20, 2025

(54) METHOD AND APPARATUS OF MOTION VECTOR CONSTRAINT FOR VIDEO CODING

(71) Applicant: HFI INNOVATION INC., Zhubei (TW)

(72) Inventors: Tzu-Der Chuang, Hsinchu (TW); Ching-Yeh Chen, Hsinchu (TW); Yu-Wen Huang, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 34 days.

(21) Appl. No.: 18/325,588

(22) Filed: May 30, 2023

(65) Prior Publication Data

US 2023/0300370 A1 Sep. 21, 2023

Related U.S. Application Data

(63) Continuation of application No. 16/613,674, filed as application No. PCT/CN2018/087351 on May 17, 2018, now Pat. No. 11,700,391.

(Continued)

(51) Int. Cl.
*H04N 19/52* (2014.01)
*H04N 19/159* (2014.01)
(Continued)

(52) U.S. Cl.
CPC ........... *H04N 19/52* (2014.11); *H04N 19/159* (2014.11); *H04N 19/176* (2014.11); *H04N 19/189* (2014.11)

(58) Field of Classification Search
CPC .... H04N 19/52; H04N 19/159; H04N 19/176; H04N 19/189; H04N 19/55; H04N 19/54; H04N 19/513
See application file for complete search history.

(56) References Cited

U.S. PATENT DOCUMENTS 9,094,682 B2 7/2015 Sugio et al.
9,762,904 B2 9/2017 Chen et al.
(Continued)

FOREIGN PATENT DOCUMENTS

CN 103583044 A 2/2014
CN 103650507 A 3/2014
(Continued)

OTHER PUBLICATIONS

European Search Report dated Oct. 13, 2020, issued in application No. EP 18801342.9.
(Continued)

*Primary Examiner* — Richard T Torrente
(74) *Attorney, Agent, or Firm* — McClure, Qualey & Rodack, LLP

(57) ABSTRACT

Method and apparatus of Inter prediction for video coding are disclosed. When a sub-block motion compensation coding tool is selected for the current block, the method generates sub-block MVs (motion vectors) associated with multiple sub-blocks, which are included or contained in the current block, according to the sub-block motion compensation coding tool, constrains the sub-block MVs within a range to form constrained sub-block MVs, and applies motion compensation to the current block using the constrained sub-block MVs or applies motion compensation to the current block using one sub-block MV within the range around the primary MV in a second list if a corresponding sub-block MV in a first list is outside the range. In another method, motion compensation is applied to the current block only using reference pixels of reference sub-blocks within a primary reference block.

9 Claims, 7 Drawing Sheets

Related U.S. Application Data

(60) Provisional application No. 62/519,214, filed on Jun. 14, 2017, provisional application No. 62/507,838, filed on May 18, 2017.

(51) Int. Cl.
  *H04N 19/176* (2014.01)
  *H04N 19/189* (2014.01)

(56) References Cited

U.S. PATENT DOCUMENTS

| | | | |
|---|---|---|---|
| 10,021,414 B2 | 7/2018 | Seregin et al. | |
| 10,645,411 B2 | 5/2020 | Lim et al. | |
| 2010/0098169 A1 | 4/2010 | Budagavi | |
| 2013/0163668 A1 | 6/2013 | Chen | |
| 2015/0326875 A1* | 11/2015 | Chen | H04N 19/55 375/240.16 |
| 2018/0098063 A1* | 4/2018 | Chen | H04N 19/139 |
| 2018/0124411 A1* | 5/2018 | Nakagami | H04N 19/513 |
| 2018/0332093 A1* | 11/2018 | Makower | H04N 19/146 |
| 2019/0149837 A1 | 5/2019 | Lim et al. | |
| 2020/0045336 A1 | 2/2020 | Xiu | |
| 2021/0127133 A1* | 4/2021 | Chen | H04N 19/577 |

FOREIGN PATENT DOCUMENTS

| | | |
|---|---|---|
| CN | 104012096 A | 8/2014 |
| CN | 104885458 A | 9/2015 |
| CN | 105393539 A | 3/2016 |
| KR | 10-2012-0088488 A | 8/2012 |
| WO | 2013/139250 A1 | 9/2013 |
| WO | 2017/036414 A1 | 3/2017 |

OTHER PUBLICATIONS

Hsu, C.W., et al.; "Description of SOR video coding technology proposal by MediaTek;" Apr. 2018; pp. 1-88.
Chen, J., et al.; "Algorithm Description of Joint Exploration Test Model 6 (JEM6);" Joint Video Exploration Team JVET) of ITU-T SG 16 WP 3 and ISO/IE JTC 1/SC 29/WG 11; Mar.-Apr. 2017; pp. 1-49.
Suzuki, Y.; "Simplification of JVT-0110 {Block-size Adaptive MC for Complexity Reduction);" Joint Video Team (JVT) of 1S0/IEC MPEG & ITU-T VCEG (1SO/IED JTC1/SC29N/WG11 and ITU-T SG 16 Q.6); Dec. 2002; pp. 1-12.
Chinese language office action Mar. 31, 2021, issued in application No. CN 201880032510.3.
International Search Report dated Aug. 13, 2018, issued in application No. PCT/CN2018/087351.
Chen,J., etal.;"AlgorithmDescriptionofJointExploration TestModel3;" JointVideoExplorationTeam(JVET)of ITU-T SG 16 WP 3 and 1SO/IEC JTC 1/SC 29/WG 11; May-Jun. 2016; pp. 1-37.

\* cited by examiner

METHOD AND APPARATUS OF MOTION VECTOR CONSTRAINT FOR VIDEO CODING

CROSS REFERENCE TO RELATED APPLICATIONS

This is a continuation of application Ser. No. 16/613,674, filed Nov. 14, 2019, which claims priority to U.S. Provisional Patent Application, Ser. No. 62/507,838, filed on May 18, 2017 and U.S. Provisional Patent Application, Ser. No. 62/519,214, filed on Jun. 14, 2017, the entire contents of each of which are hereby incorporated by reference in their entireties.

BACKGROUND OF THE INVENTION

Field of the Invention

The present invention relates to video coding utilizing sub-block based coding tools for motion estimation/compensation. In particular, the present invention relates to constraining motion vector associated with sub-block based coding tools in order to reduce required bandwidth.

Description of the Related Art

Motion estimation/compensation is a powerful coding tool that has been used in various coding standards such as MPEG-2, H.264 and the emerging HEVC (High Efficiency Video Coding) standard. The motion information derived at the encoder side has to be transmitted to the decoder side, which may consume sizeable bandwidth. In order to improve the coding efficiency for motion information, motion vector prediction (MVP) to coding a current motion vector (MV) predictively has been developed.
Merge Mode and AMVP Mode For each Inter PU, one or two motion vectors (MVs) are determined using motion estimation. In order to increase the coding efficiency of motion vector (MV) coding in HEVC, HEVC motion vector prediction (MVP) to encode MV predictively. In particular, HEVC supports the Skip and Merge modes for MVP coding. For Skip and Merge modes, a set of candidates are derived based on the motion information of spatially neighbouring blocks (spatial candidates) or a temporal co-located block (temporal candidate). When a PU is coded using the Skip or Merge mode, no motion information is signaled. Instead, only the index of the selected candidate is coded. For the Skip mode, the residual signal is forced to be zero and not coded. In other words, no information is signaled for the residuals. Each merged PU reuses the MV, prediction direction, and reference picture index of the selected candidate.

For Merge mode in HEVC, up to four spatial MV candidates are derived from neighbouring blocks $A_0, A_1, B_0$ and $B_1$, and one temporal MV candidate is derived from bottom-right block, $T_{BR}$ or center-block $T_{CT}$ as shown in FIG. 1. For the temporal candidate, $T_{BR}$ is used first. If $T_{BR}$ is not available, $T_{CT}$ is used instead. Note that if any of the four spatial MV candidates is not available, the block $B_2$ is then used to derive MV candidate as a replacement. After the derivation process of the four spatial MV candidates and one temporal MV candidate, removing redundancy (pruning) is applied to remove any redundant MV candidate. If after removing redundancy (pruning), the number of available MV candidates is smaller than five, three types of additional candidates are derived and are added to the candidate set (candidate list). The encoder selects one final candidate within the candidate set for Skip or Merge mode based on the rate-distortion optimization (RDO) decision, and transmits the index to the decoder.

Since the derivations of Skip and Merge candidates are similar, the "Merge" mode referred hereafter may correspond to "Merge" mode as well as "Skip" mode for convenience.

The MVP technique is also applied to code a motion vector predictively, which is referred as AMVP (Advanced Motion Vector Prediction). When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the AMVP scheme is used to select a motion vector predictor among an AMVP candidate set including two spatial MVPs and one temporal MVP. Therefore, an AMVP index for MVP and the corresponding MVDs need to be encoded and transmitted for an AMVP-coded block. In addition, the Inter prediction direction to specify the prediction directions among bi-prediction and uni-prediction (i.e., list 0 (L0) and/or list 1 (L1)) associated with the reference frame index for each list should also be encoded and transmitted.

When a PU is coded in either Skip or Merge mode, no motion information is transmitted except the Merge index of the selected candidate since the Skip and Merge modes utilize motion inference methods (i.e., MV=MVP+MVD where MVD being zero) to obtain the motion information from the selected Merge/Skip candidate.

In AMVP, the left MVP is selected based on the first available one from $A_0, A_1$, the top MVP is the first available one from $B_0, B_1, B_2$, and the temporal MVP is the first available one from $T_{BR}$ or $T_{CT}$ ($T_{BR}$ is used first, if $T_{BR}$ is not available, $T_{CT}$ is used instead). If the left MVP is not available and the top MVP is not scaled MVP, the second top MVP can be derived if there is a scaled MVP among $B_0, B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.
Conventional Sub-PU Temporal Motion Vector Prediction (Sub-PU TMVP)

To improve the coding efficiency, a Sub-PU Temporal Motion Vector Prediction (Sub-PU TMVP, also called advanced temporal motion vector prediction, ATMVP) mode is applied in the merge mode. That is, the Sub-PU TMVP is a merge candidate for merge mode. As shown in FIG. 2, unlike the traditional temporal candidate, the Sub-PU TMVP mode partitions the current PU into multiple Sub-PUs, and finds all corresponding temporal collocated motion vectors for each Sub-PU. The current PU of size M×N has (M/P)×(N/Q) sub-PUs, each sub-PU is of size P×Q, which M is divisible by P, and N is divisible by Q. The example in FIG. 2 corresponds to the case that a current PU 210 is divided into 16 sub-PUs (i.e., M/P=4 and N/Q=4). Sub-PU 0 (211) and sub-PU 1 (212) are indicated. The detailed algorithm for sub-PU TMVP is described as follows.

In step 1, for the current PU 210, an "initial motion vector", denoted it as vec_init is determined for the sub-PU TMVP mode. For example, the vec_init can be the MV of the first available spatial neighbouring block of the current PU 210. Alternatively, the MV of other neighbouring block may also be used as the initial motion vector. Conventionally, the vec_init is the first available candidate among spatial neighbouring blocks. For example, if the first available spatial neighbouring block has L0 and L1 MVs, and LX is the first list for searching collocated information, then the vec_init uses L0 MV when LX=L0, or L1 when LX=L1. The value of LX (L0 or L1) depends on which list (L0 or L1) is better for collocated information. If L0 is better for collocated information (e.g. POC (Picture Order Count) distance closer than L1), then LX is equal to L0, and vice versa. LX assignment can be performed at a slice level or picture level.

A "collocated picture searching process" then starts. The "collocated picture searching process" is to find a main collocated picture for all sub-PUs in the Sub-PU TMVP mode. The main collocated picture is denoted as main_colpic. Conventionally, it first searches the reference picture selected by the first available spatial neighbouring block. Then, in B-Slices, it searches all reference pictures of current picture starting from L0 (or L1), reference index 0, then index 1, then index 2, and so on (increasing index order). If it finishes searching L0 (or L1), then it searches another list. In P-slice, it first searches the reference picture selected by the first available spatial neighbouring block. Then, it searches all reference pictures of current picture of the list starting from reference index 0, then index 1, then index 2, and so on (increasing index order).

During searching, for each searched picture, a process named "availability checking" is performed. The "availability checking" process checks the collocated sub-PU around center position of the current PU pointed by vec_init_scaled, where vec_init_scaled is the MV with appropriate MV scaling from the vec_init. Various ways can be used to determine the "around center position". In embodiment 1, the "around center position" corresponds to the center pixel. For example, if the PU size is M*N, the center is equal to position (M/2, N/2). In embodiment 2, the "around center position" corresponds to the center sub-PU's center pixel. In embodiment 3, the "around center position" may be the mix of embodiment 1 or embodiment 2 depending on the current PU shape. The detail implement of the "around center position" is not limited to these 3 embodiments. In the "availability checking", if the checking result is an inter mode, then the availability is true; otherwise (the checking result being an intra mode), then the availability is false. After "availability checking", if the availability is true, then current searched picture is labelled as the main collocated picture and the searching process finishes. If the availability is true, the MV of the "around center position" is used and scaled for the current block to derive the "default MV". If the availability is false, then it goes to search next reference picture.

During the "collocated picture searching process", MV scaling is needed when the reference picture of the vec_init is not equal to the original reference picture. The MV scaling process is that, a scaled version of the motion vector is used. The MV is scaled based on the temporal distances between the current picture and the reference picture of the vec_init and the searched reference picture, respectively. After MV scaling, the scaled MV is denoted as vec_init_scaled.

In step 2, for each sub-PU, it further finds collocated location in main_colpic. Assuming the current Sub-PU is Sub-PU i, the collocated location is calculated as shown in follows:

collocated location $x$=Sub-$PU\_i\_x$+vec_init_scaled_$i\_x$(integer part)+shift_$x$, collocated location $y$=Sub-$PU\_i\_y$+vec_init_scaled_$i\_y$(integer part)+shift_$y$.

In the above equations, Sub-PU_i_x means horizontal left-top location of sub-PU i inside the current picture (integer location), Sub-PU_i_y means vertical left-top location of sub-PU i inside the current picture (integer location), vec_init_scaled_i_x means horizontal part of vec_init_scaled_i, which has integer part and fractional part and we only use integer part in the calculation, and vec_init_scaled_i_y means vertical part of vec_init_scaled_i, which has integer part and fractional part and we only use integer part in the calculation. shift_x means a shift value. In one embodiment, shift_x can be half of sub-PU width but not limited to this embodiment. shift_y means a shift value. In one embodiment, shift_y can be half of sub-PU height, but not limited to this embodiment.

Finally, in step 3, it finds the motion information temporal predictor for each Sub-PU, which is denoted as SubPU_MI_i, of each Sub-PU. The SubPU_MI_i is the motion information (MI) from collocated_picture_i_L0 and collocated_picture_i_L1 on collocated location x, collocated location y. Here MI is defined as the set of {MV_x, MV_y, reference lists, reference index, and other merge-mode-sensitive information, such as local illumination compensation flag}. Moreover, in one embodiment, MV_x and MV_y may be scaled according to the temporal distance relation between collocated picture, current picture, and reference picture of the collocated MV. (Not limited to this embodiment). If MI is not available for some Sub-PU, then the MI of Sub-PU around center position will be used (in another word, the default MV is used).

Conventionally, there is only one Sub-PU TMVP candidate in the candidate list.

Spatial-Temporal Motion Vector Prediction (STMVP)

In JEM-3.0 (Chen et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JV n ET-C1001), a spatial-temporal motion vector prediction (STMVP) is also included in merge mode coding. In STMVP, the motion vectors of the sub-CUs are derived recursively following the raster scan order by using the temporal motion vector predictor and spatial neighbouring motion vector. FIG. 3 illustrates the concept of STMVP. Let us consider an 8×8 CU 310 which contains four 4×4 sub-CUs, A, B, C, and D. The neighbouring N×N blocks in the current frame are labeled as a, b, c, and d. The motion derivation for sub-CU A starts by identifying its two spatial neighbours. The first neighbour is N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, starting at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the co-located block at location D is fetched and scaled accordingly. At last, after retrieving and scaling the motion information, all available motion vectors (up to 3) are averaged separately for each reference list. The averaged motion vector is assigned as the motion vector of the current sub-CU.

Pattern-Based MV Derivation (PMVD)

In VCEG-AZ07 (Chen et al., "Further improvements to HMKTA-1.0", Video Coding Experts Group (VCEG) of ITU-T SG16 Q, 2015), a pattern-based MV derivation (PMVD) method is disclosed. The pattern-based MV derivation (PMVD) method is also referred as FRUC (Frame Rate Up Conversion) in VCEG-AZ07. The FRUC consists of bilateral matching for a bi-prediction block and temporal matching for a uni-prediction block.

FIG. 4 illustrates an example of FRUC (Frame Rate Up Conversion) bilateral matching mode, where the motion information for a current block 410 is derived based on two reference pictures. The motion information of the current block is derived by finding the best match between two blocks (420 and 430) along the motion trajectory 440 of the current block in two different reference pictures (i.e., Ref0 and Ref1). Under the assumption of continuous motion trajectory, the motion vectors MV0 associated with Ref0 and MV1 associated with Ref1 pointing to the two reference blocks shall be proportional to the temporal distances, i.e., TD0 and TD1, between the current picture (i.e., Cur pic) and the two reference pictures Ref0 and Ref1.

FIG. 5 illustrates an example of template matching FRUC mode. The neighbouring areas (520a and 520b) of the current block 510 in a current picture (i.e., Cur pic) are used as a template to match with a corresponding template (530a and 530b) in a reference picture (i.e., Ref0 in FIG. 5). The best match between template 520a/520b and template 530a/530b will determine a decoder derived motion vector 540. While Ref0 is shown in FIG. 5, Ref1 can also be used as a reference picture.

According to VCEG-AZ07, a FRUC_mrg_flag is signaled when the merge_flag or skip_flag is true. If the FRUC_mrg_flag is 1, then FRUC_merge_mode is signaled to indicate whether the bilateral matching merge mode or template matching merge mode is selected. If the FRUC_mrg_flag is 0, it implies that regular merge mode is used and a merge index is signaled in this case. In video coding, in order to improve coding efficiency, the motion vector for a block may be predicted using motion vector prediction (MVP), where a candidate list is generated. A merge candidate list may be used for coding a block in a merge mode. When the merge mode is used to code a block, the motion information (e.g. motion vector) of the block can be represented by one of the candidates MV in the merge MV list. Therefore, instead of transmitting the motion information of the block directly, a merge index is transmitted to a decoder side. The decoder maintains a same merge list and uses the merge index to retrieve the merge candidate as signaled by the merge index. Typically, the merge candidate list consists of a small number of candidates and transmitting the merge index is much more efficient than transmitting the motion information. When a block is coded in a merge mode, the motion information is "merged" with that of a neighbouring block by signaling a merge index instead of explicitly transmitted. However, the prediction residuals are still transmitted. In the case that the prediction residuals are zero or very small, the prediction residuals are "skipped" (i.e., the skip mode) and the block is coded by the skip mode with a merge index to identify the merge MV in the merge list.

While the term FRUC refers to motion vector derivation for Frame Rate Up-Conversion, the underlying techniques are intended for a decoder to derive one or more merge MV candidates without the need for explicitly transmitting motion information. Accordingly, the FRUC is also called decoder derived motion information in this disclosure. Since the template matching method is a pattern-based MV derivation technique, the template matching method of the FRUC is also referred as Pattern-based MV Derivation (PMVD) in this disclosure.

In the decoder side MV derivation method, a new temporal MVP called temporal derived MVP is derived by scanning all MVs in all reference pictures. To derive the LIST_0 temporal derived MVP, for each LIST_0 MV in the LIST_0 reference pictures, the MV is scaled to point to the current frame. The 4×4 block that pointed by this scaled MV in current frame is the target current block. The MV is further scaled to point to the reference picture that refidx is equal 0 in LIST_0 for the target current block. The further scaled MV is stored in the LIST_0 MV field for the target current block. FIG. 6A and FIG. 6B illustrate examples for deriving the temporal derived MVPs for LIST_0 and LIST_1 respectively. In FIG. 6A and FIG. 6B, each small square block corresponds to a 4×4 block. The temporal derived MVPs process scans all the MVs in all 4×4 blocks in all reference pictures to generate the temporal derived LIST_0 and LIST_1 MVPs of current frame. For example, in FIG. 6A, blocks 610, blocks 612 and blocks 614 correspond to 4×4 blocks of the current picture (Cur. pic), LIST_0 reference picture with index equal to 0 (i.e., refidx=0) and LIST_0 reference picture with index equal to 1 (i.e., refidx=1) respectively. Motion vectors 620 and 630 for two blocks in LIST_0 reference picture with index equal to 1 are known. Then, temporal derived MVP 622 and 632 can be derived by scaling motion vectors 620 and 630 respectively. The scaled MVP is then assigned it to a corresponding block. Similarly, in FIG. 6B, blocks 640, blocks 642 and blocks 644 correspond to 4×4 blocks of the current picture (Cur. pic), LIST_1 reference picture with index equal to 0 (i.e., refidx=0) and LIST_1 reference picture with index equal to 1 (i.e., refidx=1) respectively. Motion vectors 650 and 660 for two blocks in LIST_1 reference picture with index equal to 1 are known. Then, temporal derived MVP 652 and 662 can be derived by scaling motion vectors 650 and 660 respectively.

For the bilateral matching merge mode and template matching merge mode, two-stage matching is applied. The first stage is PU-level matching, and the second stage is the sub-PU-level matching. In the PU-level matching, multiple initial MVs in LIST_0 and LIST_1 are selected respectively. These MVs includes the MVs from merge candidates (i.e., the conventional merge candidates such as these specified in the HEVC standard) and MVs from temporal derived MVPs. Two different starting MV sets are generated for two lists. For each MV in one list, a MV pair is generated by composing of this MV and the mirrored MV that is derived by scaling the MV to the other list. For each MV pair, two reference blocks are compensated by using this MV pair. The sum of absolutely differences (SAD) of these two blocks is calculated. The MV pair with the smallest SAD is selected as the best MV pair.

Affine Motion Compensation Prediction

In HEVC, only translation motion model is applied for motion compensation prediction (MCP). While in the real world, there're many kinds of motions, e.g. zoom in/out, rotation, perspective motions and the other irregular motions. The affine model is capable of describing two-dimensional block rotations as well as two-dimensional deformations to transform a square (or rectangles) into a parallelogram. This model can be described as follows:

$x' = ax + by + e,$ $y' = cx + dy + f.$

In this model, a total of six parameters (i.e., a, b, c, d, e and f) are used. For each pixels A (x, y) in the area of interest, the motion vector between this pixel and its corresponding reference pixel A'(x', y') can be derived using motion vector field (MVF) of a block. FIG. 7 illustrates an example of motion compensation according to the affine model, where a current area 710 is mapped to a reference area 720 in a reference picture. The affine transform can map any triangle to any triangle. In other words, the correspondences between the three corner pixels (i.e., control points) of the current area and the three corner pixels of the reference area can be determined by the three motion vectors (v0, v1 and v2) associated with the three control points as shown in FIG. 7. The six parameters for the affine model can be derived based on three known motion vectors for three different locations. The motion vector for a target location (x,y) of the block can be determined according to:

$$\begin{cases} v_x = \frac{(v_{1x} - v_{0x})}{s}x - \frac{(v_{2x} - v_{0x})}{s}y + v_{x0} \\ v_y = \frac{(v_{1y} - v_{0y})}{s}x - \frac{(v_{2y} - v_{0y})}{s}y + v_{yo} \end{cases}$$

In the above equation, $(v_{0x}, v_{0y})$ is motion vector $v_0$ of the top-left corner control point, $(v_{1x}, v_{1y})$ is motion vector $v_1$ of the top-right corner control point, and $(v_{2x}, v_{2y})$ is motion vector $v_2$ of the bottom-left corner control point.

In JEM-3, a simplified affine transform motion compensation prediction is applied to improve the coding efficiency. As shown FIG. 8, the affine motion field of the block is described by motion vectors associated with two control points.

The motion vector field (MVF) of a block is described by the following equation:

$$\begin{cases} v_x = \frac{(v_{1x} - v_{0x})}{s}x - \frac{(v_{1x} - v_{0x})}{s}y + v_{x0} \\ v_y = \frac{(v_{1y} - v_{0y})}{s}x - \frac{(v_{1y} - v_{0y})}{s}y + v_{yo} \end{cases}$$

In the above equation, $(v_{0x}, v_{0y})$ is motion vector $v_0$ of the top-left corner control point and $(v_{1x}, v_{1y})$ is motion vector $v_1$ of the top-right corner control point.

In order to further simplify the motion compensation prediction, block based affine transform prediction is applied. To derive motion vector of each 4×4 sub-block, the motion vector of the center sample of each sub-block, as shown in FIG. 8, is calculated according to the above equation (1), and the result is rounded to 1/16 fraction accuracy. Then the motion compensation interpolation is applied to generate the prediction of each sub-block with the derived motion vector.

After MCP, the high accuracy motion vector of each sub-block is rounded and saved as the same accuracy as the normal motion vector.

In ATMVP, STMVP, affine mode prediction, and the pattern-based motion vector derivation (PMVD) merge mode, the sub-block motion compensation is applied. A CU/PU is divided into several sub-blocks. Each block can have different reference pictures and different MVs. If the MVs of each sub-block are very diverse, a lot of bandwidth is required for the sub-block motion compensation.

When motion compensation is performed, one or more reference blocks have to be retrieved for motion compensation. Since fractional-pel motion vector is supported in newer coding standards such as HEVC, addition reference pixels around the reference block have to be retrieved as well. The number of rows or columns required for interpolation at fractional-pel locations is the same for all block sizes. Therefore, for smaller block sizes, the bandwidth issue is more serious. Overlapped block motion compensation (OBMC) is a technique to alleviate coding artefacts at block boundaries by processing additional data extended from the block boundaries. The motion compensated pixels in the overlapped area are blended to reduce the visibility of the coding artefacts. Again, the OBMC will result in additional bandwidth requirement.

When a sub-block motion compensation coding tool is used, the motion vectors associated with the sub-block may be different. The reference pixels of sub-blocks pointed by the sub-block MVs may spread out. This will further increase required system bandwidth. Therefore, it is desired to develop methods to reduce the required bandwidth for sub-block motion compensation coding tools.

SUMMARY OF THE INVENTION

Method and apparatus of Inter prediction for video coding performed by a video encoder or a video decoder are disclosed. When a sub-block motion compensation coding tool is selected for the current block, the method generates sub-block MVs (motion vectors) associated with multiple sub-blocks, which are included or contained in the current block, according to the sub-block motion compensation coding tool, constrains the sub-block MVs within a range to form constrained sub-block MVs, and applies motion compensation to the current block using the constrained sub-block MVs or applies motion compensation to the current block using one sub-block MV within the range in a second list if a corresponding sub-block MV in a first list is outside the range around the primary MV. In one embodiment, the sub-block MVs are constrained with a range around a primary MV.

The sub-block motion compensation coding tool is selected from a group comprising ATMVP (Advanced Temporal Motion Vector Prediction), STMVP (Spatial-Temporal Motion Vector Prediction), affine prediction, and sub-block refined PMVD (Pattern-based Motion Vector Derivation) mode.

For the ATMVP, the primary MV may correspond to a default MV, an initial MV, a scaled initial MV, one of the sub-block MVs of the current block, or one derived MV. For example, the primary MV corresponds to one sub-block MVs of one corner sub-block or one center sub-block, one derived MV using center pixel or center block of the current block, or one derived MV using one sub-block around a center position.

For the STMVP, the primary MV may correspond to a firstly derived sub-block MV, a MV of neighbouring blocks, a temporal collocated MV, or a derived MV. For example, the primary MV corresponds to one sub-block MVs of one corner sub-block or one center sub-block, the primary MV corresponds to the derived MV that is derived by using a center pixel or center block of the current block.

For the affine prediction, the primary MV may correspond to one of control-point MVs, one of the sub-block MVs of the current block, or one derived MV. For example, said one of the sub-block MVs of the current block corresponds to one MV of one corner sub-block or one MV of one center sub-block, or said one derived MV corresponds to one derived MV using one center pixel or center block of the current block.

For the sub-block refined PMVD mode, the primary MV may correspond to one initial MV of one current PU (prediction unit), CU (coding unit), or current block, or one refined MV of one current PU, CU, or current block.

The constraining the sub-block MVs within the range around the primary MV may comprise restricting a difference between the primary MV and each sub-block MV of the sub-block MVs within one or more thresholds. For example, each sub-block MV of the sub-block MVs can be restricted to the range from (primary MV−Threshold) to (primary MV+Threshold), wherein Threshold corresponds to one threshold and if one sub-block MV is outside the range, the sub-block MV is clipped to the range. In another example, each of said one or more thresholds corresponds to a predefined value, a derived value or a signaled value. Said one or more thresholds can be signaled in a sequence parameter set, picture parameter set, or slice header at an encoder side or parsed from the sequence parameter set, picture parameter set, or slice header at a decoder side. Said one or more thresholds can be determined depending on size, width or height of the current block or the current sub-block, or depending on the primary MV, the inter prediction direction of the current block or the current sub-block. Different sub-blocks can use different thresholds.

When the sub-block motion compensation coding tool is selected for the current block at a video encoder, the video encoder may constrain the sub-block MVs to be within a range around a primary MV to form constrained sub-block MVs and signals information related to the constrained sub-block MVs in a video bitstream. In another embodiment, at video encoder, all the sub-block MVs are restricted to be within a range around a primary MV and signals information related to the sub-block MVs in a video bitstream. At a video decoder, the video decoder may derive the primary MV and then load required reference data around the primary MV.

Another method and apparatus of Inter prediction for video coding performed by a video encoder or a video decoder are also disclosed. When a sub-block motion compensation coding tool is selected for the current block, the method derives a primary reference block, generates sub-block MVs (motion vectors) associated with multiple sub-blocks, which are included or contained in the current block, according to the sub-block motion compensation coding tool, and applies motion compensation to the current block using one or more reference pixels of reference sub-blocks within the primary reference block and excludes any reference pixel of reference sub-blocks outside the primary reference block, wherein the reference sub-blocks are pointed by sub-block MVs. In one embodiment, the primary reference block covers a reference block pointed by the primary MV.

DETAILED DESCRIPTION OF THE PREFERRED EMBODIMENTS

Figure 1:
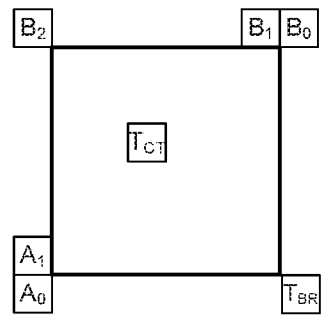
FIG. 1 illustrates the spatial and temporal neighbouring blocks used to derive Merge candidates according to HEVC (High Efficiency Video Coding).
Figure 2:
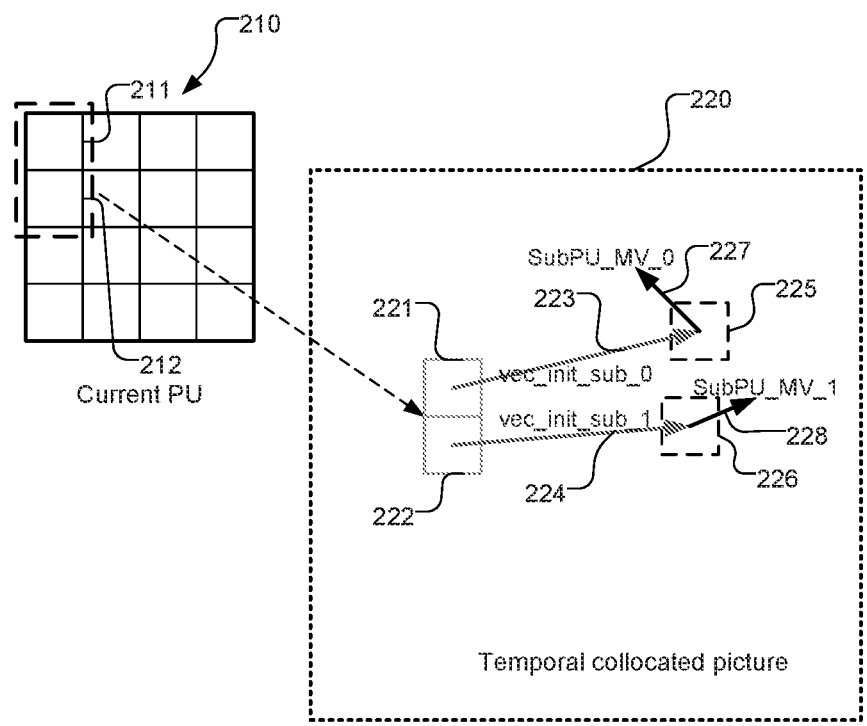
FIG. 2 illustrates an example Sub-PU TMVP (Temporal Motion Vector Prediction) mode, where a current PU is partitioned into multiple Sub-PUs and all corresponding temporal collocated motion vectors for each Sub-PU are derived.

The following description is of the best-contemplated mode of carrying out the invention. This description is made for the purpose of illustrating the general principles of the invention and should not be taken in a limiting sense. The scope of the invention is best determined by reference to the appended claims.

To reduce the bandwidth requirement, a MV constraint is applied according to the present invention for the sub-block motion compensation tools, which include ATMVP (Advanced Temporal Motion Vector Prediction), STMVP (Spatial-Temporal Motion Vector Prediction), affine mode, and sub-block refined PMVD (Pattern-based Motion Vector Derivation) mode. If the sub-block motion compensation mode is applied to the current block, the MVs of the current block are restricted within a range. The range can be restricted to a range around a primary MV. The MV difference of each sub-block in a CU/PU is restricted with one or more thresholds. For example, a primary MV in a reference list is first derived. All MVs in the reference list in the current block are restricted within the range of primary MV±a threshold (i.e., from primary MV−a threshold to primary MV+a threshold). If the sub-block MV is outside of the restriction range, the sub-block MV is clipped within the restriction range or replaced by the primary MV. In another example, if MV of one of the list is outside of the restriction range while the MV of the other list is inside the restriction range, only the MV of the other list is used. The MV of the list that is outside of the restriction range is modified as non-valid. In some embodiments, if the MV is inside or outside the restriction range may be determined according to the reference block pointed by the MV or any other MV related information, which should not be limited in this disclosure. For example, a reference-block range is defined. If the reference block pointed by the MV or any other MV related information is covered by the reference-block range, the MV is considered as inside the restriction range.

The threshold can be a predefined value, a derived value, or a signaled value. The threshold can be signaled in the sequence parameter set, picture parameter set, or slice header. The threshold can be a fixed value or an adaptive value. For example, the threshold value can depend on the size of the current block, the width/height of the current block or the current sub-block, the primary MV, the inter prediction direction of the current block or the current sub-block, or the combination of the above. In one example, the threshold can be 2 for CU area smaller than 64, and is 16 for CU area equal to or larger than 64. In one example, the threshold is larger or un-limited for the uni-predicted block, and is smaller for the bi-predicted block. Multiple thresholds can also be used. For example, one threshold is for the horizontal component of the MV and the other one threshold is for the vertical component of the MV. The horizontal component of the MV threshold can be dependent on the size of the current block or the width and/or height of the current block. The vertical component of the MV threshold can be dependent on the size of the current block or the height and/or width of the current block. For one direction, the threshold can be different for positive direction and negative direction. For example, the horizontal components of the MVs of a current block are limited within the range of (primary_MVx−$threshold X_1$, primary_MVx+$threshold X_2$). The $threshold X_1$ and $threshold X_2$ can depend on the size of the current block, the width and/or height of the current block, or the primary MV.

For ATMVP, the primary MV can be the default MV, the initial motion vector (vec_init), scaled initial MV (vec_init_scaled), one of the sub-block MVs in the current block (e.g. the MVs of the corner sub-blocks or the MV of the center sub-blocks), or one derived MV (e.g. the derived MV using the center pixel or center block of the current block, or the derived MV using the Sub-PU around the center position).

Figure 3:
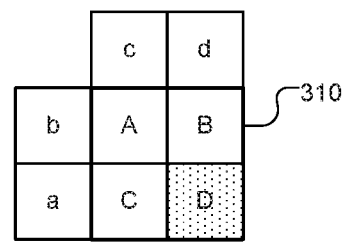
FIG. 3 illustrates the concept of STMVP (Spatial-Temporal Motion Vector Prediction).
Figure 4:
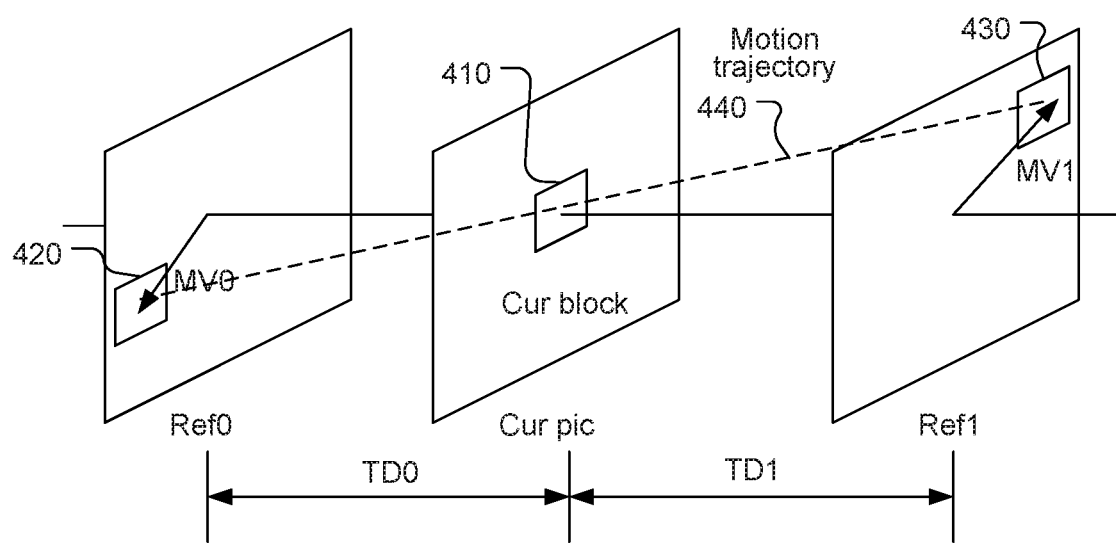
FIG. 4 illustrates an example of bilateral matching for the FRUC (Frame Rate Up Conversion) mode.
Figure 5:
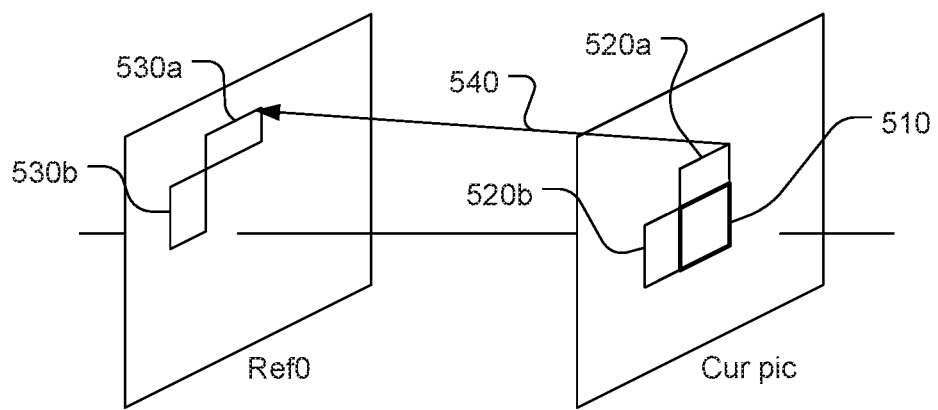
FIG. 5 illustrates an example of template matching for the FRUC (Frame Rate Up Conversion) mode.
Figure 6A:
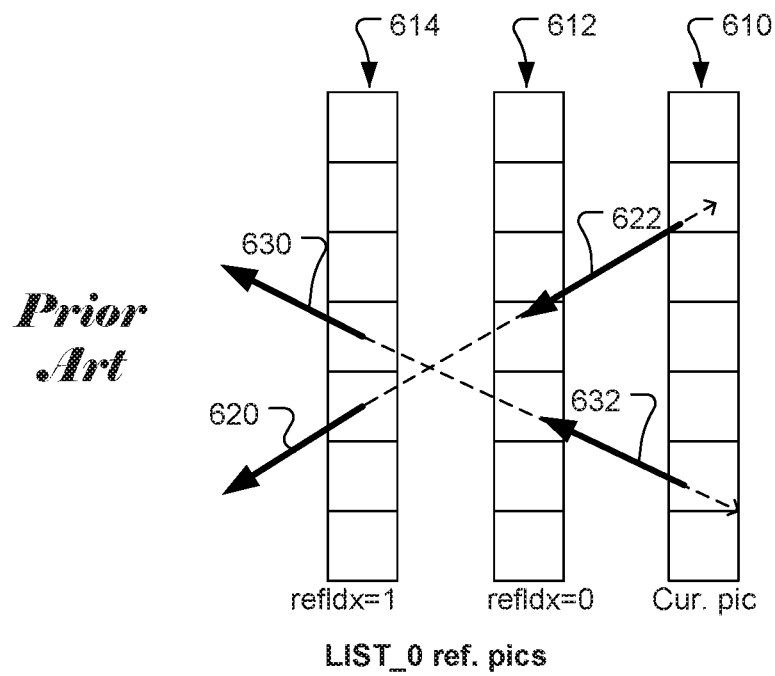
FIG. 6A and FIG. 6B illustrate examples for deriving the temporal derived MVPs for List_0 and List_1 respectively.
Figure 6B:
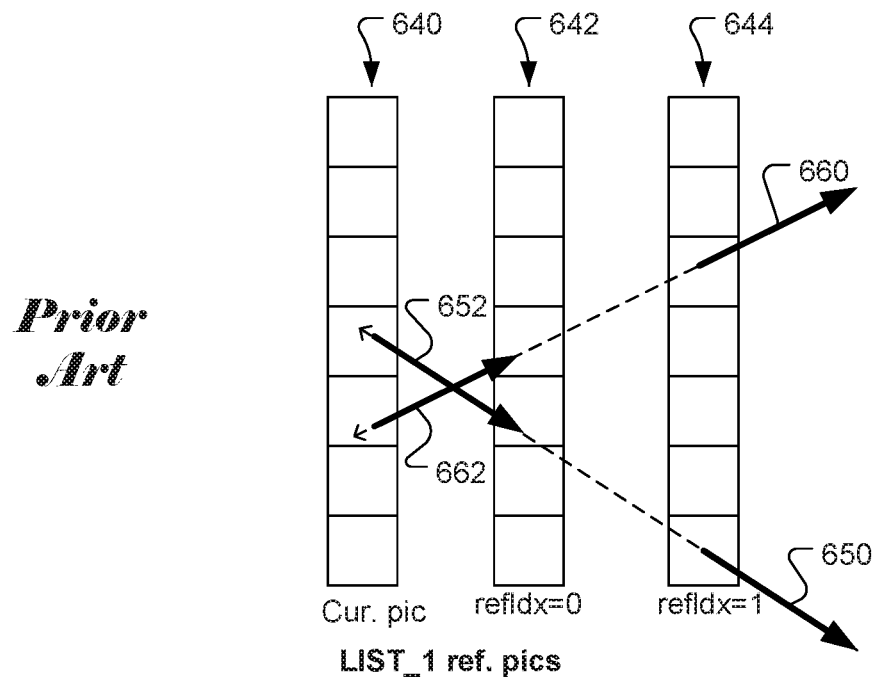
Figure 7:
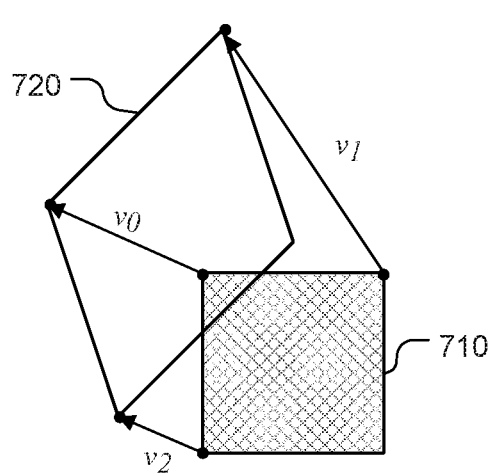
FIG. 7 illustrates an example of motion compensation according to the affine model, where a current area is mapped to a reference area in a reference picture.
Figure 8:
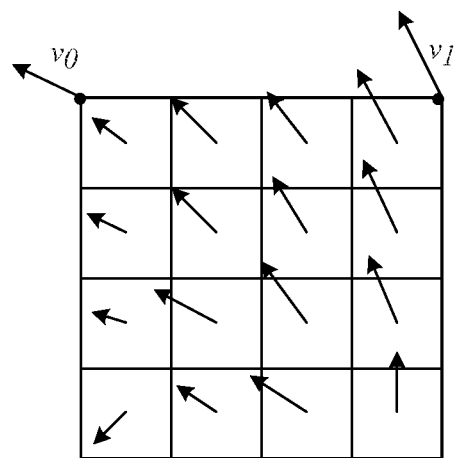
FIG. 8 illustrates an example of motion compensation according to the affine model, where the affine motion field of the block is described by motion vectors associated with two control points.

For STMVP, the primary MV can be the first one of at least one derived sub-block MV (e.g. the MV of sub-block A which is the first one derived according to a deriving order in FIG. 3), a MV of neighbouring blocks, a temporal collocated MV, or one derived MV. In one example, the derived MV can be the MV derived by using the center pixel or center block of the current block.

For the affine mode, the primary MV can be one of the control point MVs, one of the sub-block MVs in current block (e.g. the MVs of the corner sub-blocks or the MV of the center sub-blocks), or one derived MV (e.g. the derived MV using the center pixel or center block of the current block).

In another embodiment, for affine mode, if the MVs of the control points are outside of the restriction range, the MVs of the control points are first clipped within the restriction range or replaced by the primary MV. After the clipping or replacement, the MVs of each sub-block are derived by using the new control point MVs.

For the PMVD merge mode, the primary MV can be the PU initial MV or the CU/PU refined MV. The sub-block refined MV should be limited around the primary MV.

In one embodiment, the MV threshold can be different for different sub-blocks. For example, the horizontal MV of the sub-block 1 is within the range of (primary_MVx−$threshold X_1$, primary_MVx+$threshold X_2$), and the horizontal MV of the sub-block 2 is within the range of (primary_MVx−$threshold X_3$, primary_MVx+$threshold X_4$). The $threshold X_1$ can be different from $threshold X_3$. For example, if the location of the sub-block 1 is left to the location of the sub-block 2, the $threshold X_1$ can be smaller than $threshold X_3$.

The proposed method can be applied normatively or can be applied as encoder-side constraint. If it's normative, the MVs of all sub-block are generated with the rule as described above. All the MVs will be within the restriction range around the primary MV. For encoder constraint, it is a requirement of bitstream conformance that the MVs of all sub-blocks shall follow the rule as describe before. All the MVs of the sub-blocks shall be within the restriction range around the primary MV. If not, this mode or this merge candidate shall not be selected in the encoder side.

In decoder side, when the current block is coded in the sub-block motion compensation mode, the primary MV is first derived. The decoder can load the reference data around the primary MV. For example, the block with the size of ($thresholdX1$+blockWidth+interpolationFilterTapLength−1+$thresholdX2$)*($thresholdX1$+blockHeight+interpolationFilterTapLength−1+$thresholdX2$) can be loaded.

Figure 9:
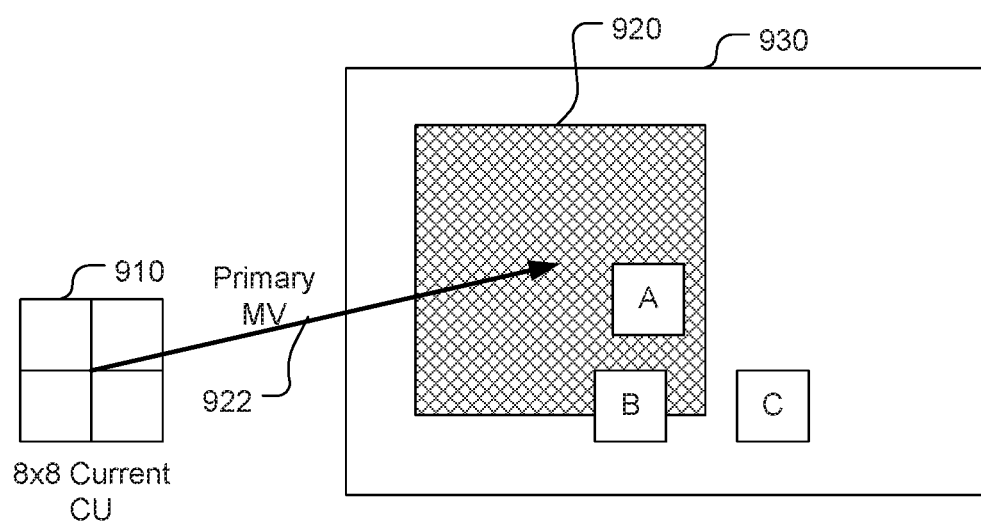
FIG. 9 illustrates an example that a primary reference block covering the block pointed by the primary MV is used for the motion compensation of all sub-blocks, where if the required reference pixels are within the primary reference block, the original reference pixels are used and if the required reference pixels are outside the primary reference block, the original reference pixels are not used.

In another embodiment, the sub-block MV is not limited to be around the primary MV. In this embodiment, a reference block (referred as primary reference block in this disclosure) is used for the motion compensation of all sub-blocks. In one embodiment, the primary reference block covers a block pointed by the primary MV. In sub-block motion compensation, if the required reference pixels are within the primary reference block, the original reference pixels are used. If the required reference pixels are not within the reference block, pseudo reference pixels are used. The pseudo reference pixels can be a predefined pixel value or the padding pixels of the reference block. The size and shape of the reference block can depend on the current CU size and shape. FIG. 9 shows an example. For an 8×8 CU 910, a primary MV 922 is first derived. Primary reference block 920 pointed by the primary MV 922 in reference picture 930 is used for the motion compensation of the sub-blocks of the 8×8 CU. If all the reference pixels of a sub-blocks are within the primary reference block 920 (e.g. block A, all the reference pixels of which are within the primary reference block 920), the pixels in the reference block are used. If the reference pixels of a sub-blocks are not within the primary reference block 920 (e.g. block C, reference pixels of which are not within the primary reference block 920), the padded pixels according to the reference block 920 are used. If part of the reference pixels of a sub-blocks are within the primary reference block and part of the reference pixels are not (e.g. block B, which has part of the reference pixels within the primary reference block 920 and has part of the reference pixels not within the primary reference block 920), part of pixels in the primary reference block and part of padded pixels are used. In another embodiment, the interpolation filter coefficients are modified to exclude any reference pixel of reference sub-blocks outside the primary reference block.

Figure 10:
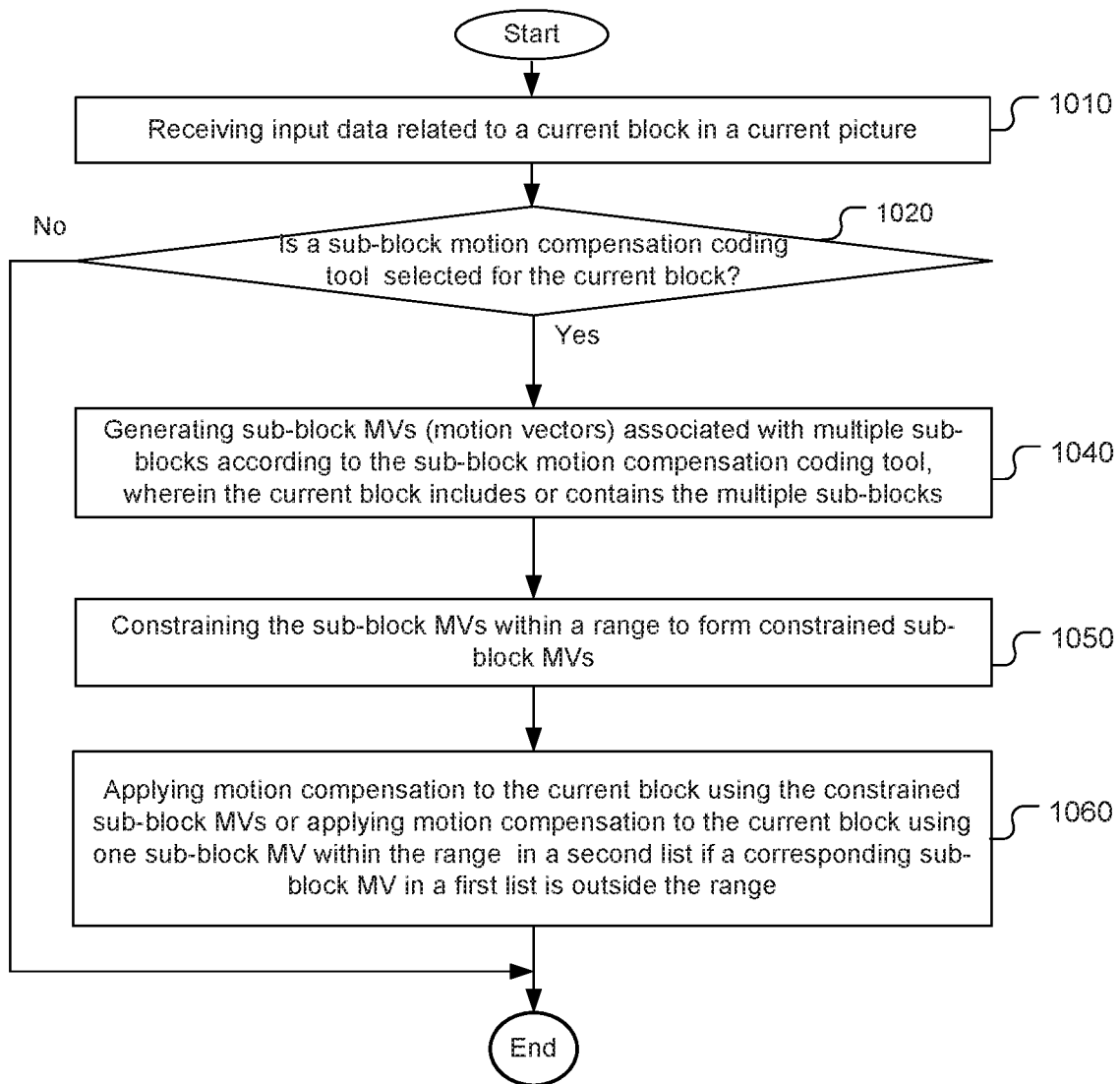
FIG. 10 illustrates an exemplary flowchart of a video coding system using constrained sub-block motion vectors according to an embodiment of the present invention.

FIG. 10 illustrates an exemplary flowchart of a video coding system using constrained sub-block motion vectors according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block in a current picture is received in step 1010. The input data may correspond to pixel data to be encoded at a video encoder side or a video bitstream corresponding to compressed data including the current block at a video decoder side. Whether a sub-block motion compensation coding tool is selected for the current block is checked in step 1020. If a sub-block motion compensation coding tool is selected for the current block (i.e., the "yes" path from step 1020), steps 1040 to 1060 are performed. Otherwise (i.e., the "no" path from step 1020), steps 1040 to 1060 are skipped. In step 1040, sub-block MVs (motion vectors) associated with multiple sub-blocks are generated according to the sub-block motion compensation coding tool, wherein the current block includes or contains the multiple sub-blocks. In step 1050, the sub-block MVs are constrained within a range to form constrained sub-block MVs. In step 1060, motion compensation is applied to the current block using the constrained sub-block MVs or motion compensation is applied to the current block using one sub-block MV within the range in a second list if a corresponding sub-block MV in a first list is outside the range.

Figure 11:
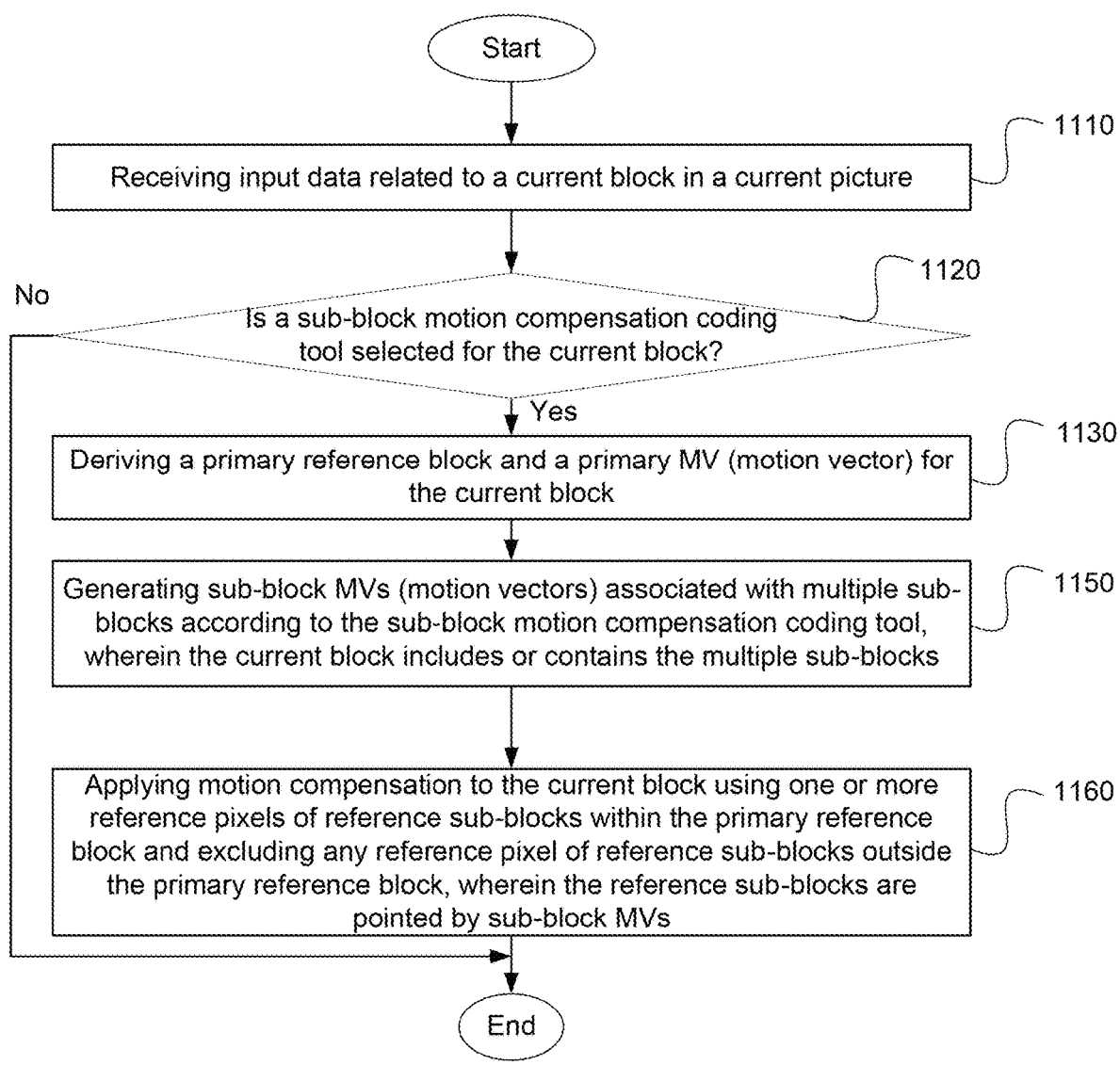
FIG. 11 illustrates another exemplary flowchart of a video coding system using constrained sub-block motion vectors according to an embodiment of the present invention.

FIG. 11 illustrates another exemplary flowchart of a video coding system using constrained sub-block motion vectors according to an embodiment of the present invention. According to this method, input data associated with a current block in a current picture is received in step 1110. The input data may correspond to pixel data to be encoded at a video encoder side or a video bitstream corresponding to compressed data including the current block at a video decoder side. Whether a sub-block motion compensation coding tool is selected for the current block is checked in step 1120. If a sub-block motion compensation coding tool is selected for the current block (i.e., the "yes" path from step 1120), steps 1130 to 1160 are performed. Otherwise (i.e., the "no" path from step 1120), steps 1130 to 1160 are skipped. In step 1130, a primary reference block and primary motion vector are derived. In step 1150, sub-block MVs (motion vectors) associated with multiple sub-blocks are generated according to the sub-block motion compensation coding tool, wherein the current block includes or contains the multiple sub-blocks. In step 1160, motion compensation is applied to the current block using one or more reference pixels of reference sub-blocks within the primary reference block and excluding any reference pixel of reference sub-blocks outside the primary reference block, wherein the reference sub-blocks are pointed by sub-block MVs.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

Figure 12:
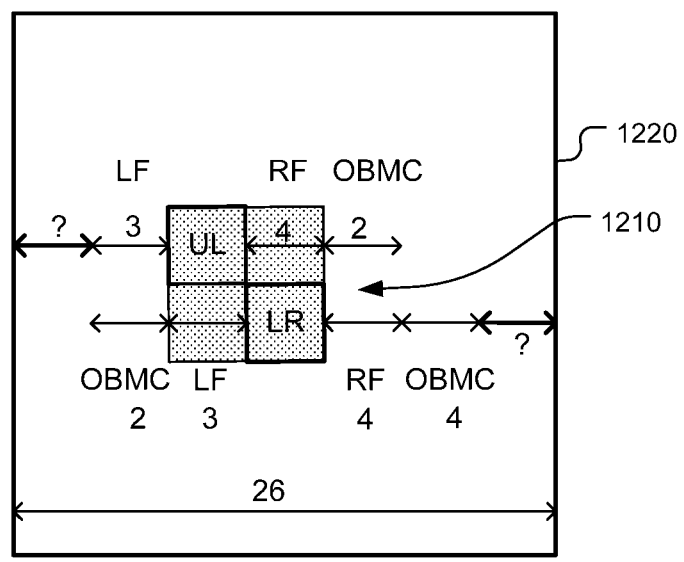
FIG. 12 illustrates an example of bandwidth analysis for constrained MVs according to an embodiment of the present invention.

FIG. 12 illustrates an example of bandwidth analysis for constrained MVs according to an embodiment of the present invention. In this example, OBMC is enabled and the current block is a bi-prediction block. The current block 1210 is 8×8, which includes or contains four 4×4 sub-blocks for sub-block based motion compensation. FIG. 12 illustrates the required reference pixels 1220 to be accessed in order to perform the sub-block based motion compensation. For example, the additional pixel data outside the collocated block are indicated for the upper-left sub-block (labelled as UL in FIG. 12) and the lower-right sub-block (labelled as LR in FIG. 12). In FIG. 12, LF refers to the required number of pixels on the left side of a sub-block for interpolation filter, RF refers to the required number of pixels on the right side of a sub-block for interpolation filter, and OBMC refers to the required number of pixels for OBMC on one boundary. For the internal block boundary between sub-blocks, two additional reference sample lines are required. For the external block boundary between CUs, it requires 4 pixel lines for the CU right boundary and bottom boundary. The question mark "?" in FIG. 12 refers to the threshold yet to be determined for constraining the MVD. If the target bandwidth is limited to 26×26 for an 8×8 block, the threshold will be 3.5 according to an embodiment of the present invention since 19 pixels (i.e., 3+8+4+4) are already requires and only 3.5 pixels are remaining (i.e., (26−19)/2). The threshold for other coding conditions can be derived similarly.

Any of the foregoing proposed methods can be implemented in encoders and/or decoders. For example, any of the proposed methods can be implemented in a sub-block partitioning module or a MV derivation module of an encoder, and/or a sub-block partitioning module or a MV derivation module of a decoder. Alternatively, any of the proposed methods can be implemented as a circuit coupled to the sub-block partitioning module or the MV derivation module of the encoder and/or the sub-block partitioning module or the MV derivation module of the decoder, so as to provide the information needed by the sub-block partitioning module or the MV derivation module.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using an inter-prediction mode in a video coding system, the method comprising:
    receiving input data associated with a current block in a current picture;
    when a sub-block motion compensation coding tool is selected for the current block:
    deriving a primary reference block;
    generating sub-block MVs (motion vectors) associated with multiple sub-blocks according to the sub-block motion compensation coding tool, wherein the current block comprises the multiple sub-blocks; and
    applying motion compensation to the current block using one or more reference pixels of reference sub-blocks within the primary reference block and excluding any reference pixel of reference sub-blocks outside the primary reference block, wherein the reference sub-blocks are pointed by the sub-block MVs.

2. The method of claim 1, wherein the primary reference block covers a reference block pointed by a primary MV.

3. The method of claim 1, wherein any reference pixel of reference sub-blocks outside the primary reference block is replaced by a pseudo reference pixel.

4. The method of claim 3, wherein the pseudo reference pixel corresponds to a predefined pixel value or a padding pixel of the primary reference block.

5. The method of claim 1, wherein interpolation filter coefficients are modified to exclude any reference pixel of reference sub-blocks outside the primary reference block.

6. The method of claim 1, wherein size and shape of the primary reference block is determined according to size and shape of the current block or current sub-block, the primary MV, inter prediction direction of the current or the current sub-block, or the combination of the above.

7. The method of claim 1, wherein the sub-block motion compensation coding tool is selected from a group comprising ATMVP (Advanced Temporal Motion Vector Prediction), STMVP (Spatial-Temporal Motion Vector Prediction), affine prediction, and sub-block refined PMVD (Pattern-based Motion Vector Derivation) mode.

8. The method of claim 1, further comprising deriving a primary motion vector associated with the primary reference block.

9. An apparatus of video coding using an inter-prediction mode in a video coding system, the apparatus comprising one or more electronic devices or processors configured to:
    receive input data associated with a current block in a current picture;
    when a sub-block motion compensation coding tool is selected for the current block:
    derive a primary reference block;
    generate sub-block MVs (motion vectors) associated with multiple sub-blocks according to the sub-block motion compensation coding tool, wherein the current block comprises the multiple sub-blocks; and
    apply motion compensation to the current block using one or more reference pixels of reference sub-blocks within the primary reference block and exclude any reference pixel of reference sub-blocks outside the primary reference block, wherein the reference sub-blocks are pointed by the sub-block MVs.

* * * * *